(12) United States Patent
Lo et al.

(10) Patent No.: US 6,980,714 B2
(45) Date of Patent: Dec. 27, 2005

(54) FIBER OPTIC ROTARY JOINT AND ASSOCIATED REFLECTOR ASSEMBLY

(75) Inventors: K. Peter Lo, Blacksburg, VA (US); Norris E. Lewis, Christiansburg, VA (US)

(73) Assignee: Moog Components Group Inc., East Aurora, NY (US)

( * ) Notice: Subject to any disclaimer, the term of this patent is extended or adjusted under 35 U.S.C. 154(b) by 171 days.

(21) Appl. No.: 10/672,427

(22) Filed: Sep. 26, 2003

(65) Prior Publication Data

US 2005/0069249 A1    Mar. 31, 2005

(51) Int. Cl.$^7$ .............................. G02B 6/26; G02B 6/32
(52) U.S. Cl. .......................................... 385/26; 385/33
(58) Field of Search .............................. 385/25, 26, 33, 385/77

(56) References Cited

U.S. PATENT DOCUMENTS

| | | | |
|---|---|---|---|
| 4,039,878 A | * | 8/1977 | Eijkelenboom et al. ..... 313/113 |
| 4,525,025 A | | 6/1985 | Hohmann et al. |
| 5,991,478 A | | 11/1999 | Lewis et al. |
| 6,104,849 A | | 8/2000 | Lewis et al. |
| 6,385,367 B1 | | 5/2002 | Rogers et al. |
| 6,453,088 B1 | | 9/2002 | Lewis et al. |
| 6,536,095 B2 | | 3/2003 | Perdue |

FOREIGN PATENT DOCUMENTS

JP    09-308625    12/1997

* cited by examiner

Primary Examiner—John D. Lee
Assistant Examiner—Rhonda S. Peace
(74) Attorney, Agent, or Firm—Phillips Lytle LLP

(57) ABSTRACT

A fiber optic rotary joint and an associated reflector assembly are provided for supporting optical communications between a rotor and a stator. The fiber optic rotary joint includes at least one optical source carried by the rotor or the stator for transmitting optical signals. The fiber optic rotary joint also includes a reflector mounted upon the other one of the rotor and stator for reflecting the optical signals. Further, the fiber optic rotary joint includes a receiver for receiving the optical signals following their reflection. The reflector is generally shaped and positioned such that the path length along which the optical signals propagate from the optical source(s) to the receiver is equal, regardless of the rotational position of the rotor to the stator. The reflector may have a reflective surface shaped to define a portion of an ellipse and/or a reflective surface shaped to define a portion of a hyperbola.

50 Claims, 4 Drawing Sheets

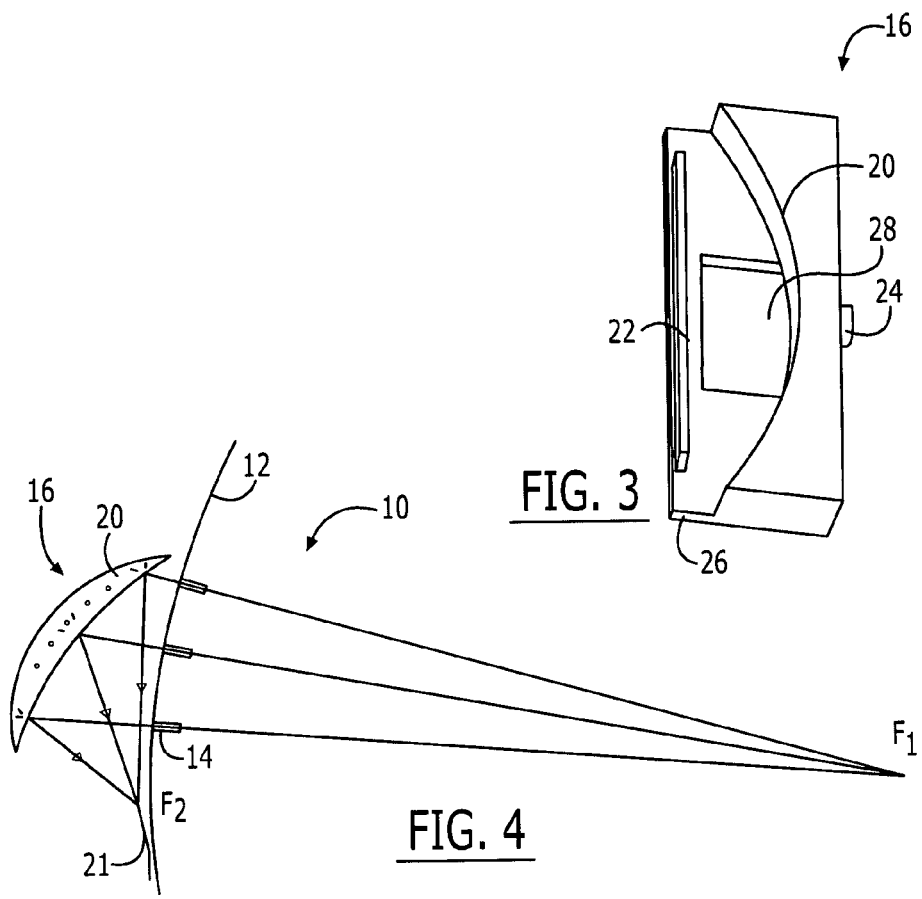
FIG. 3
FIG. 4
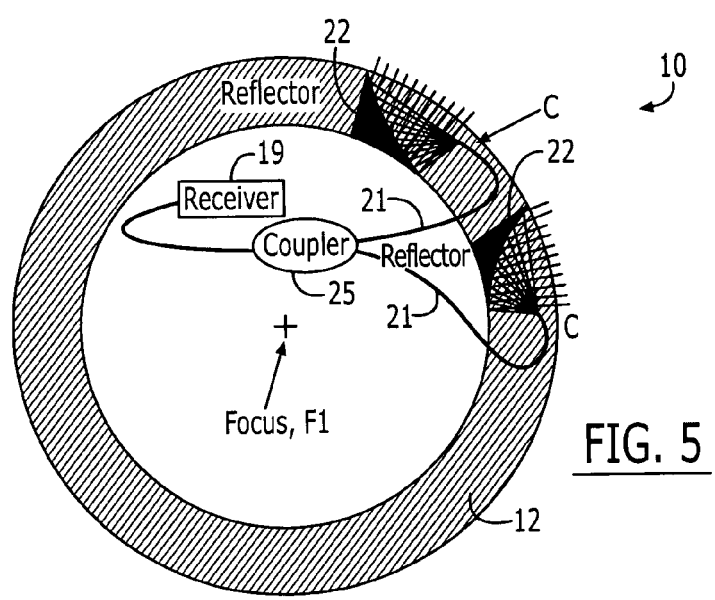
FIG. 5

FIBER OPTIC ROTARY JOINT AND ASSOCIATED REFLECTOR ASSEMBLY

FIELD OF THE INVENTION

The present invention relates generally to fiber optic rotary joints for providing optical communication between a rotor and a stator, as well as an associated reflector assembly for facilitating such optical communication.

BACKGROUND OF THE INVENTION

It is often necessary to transmit data and/or power across a rotary interface, such as the interface between a rotating member, such as a rotor, and a stationary member, such as a stator. For example, computed tomography (CT) scanners as well as other applications require data transmission across a rotary interface. In order to facilitate data transmission across the rotary interface, a slip ring is generally employed having a rotating element that rotates with the rotor and a stationary element affixed to the stator.

Initially, slip rings were developed to support electrical communication between a rotor and a stator. As data rates increased, however, electrical transmission of the data became impractical. As such, slip rings were then developed to support optical communications across the rotary interface, such as between a rotor and a stator. Optical communication could transmit data at much higher rates than prior electrical communication techniques.

Fiber optic rotary joints are generally categorized as either an on-axis rotary joint in which the optical fibers that will communicate lie along the axis of rotation or an off-axis rotary joint in which the optical fibers do not lie along the axis of rotation, typically because the axis of rotation is inaccessible. In conjunction with fiber optic rotary joints that support optical communications between the rotor and stator of a CT scanner, for example, the axis of rotation extends centrally through the bore or tube in which the patient is disposed. Thus, optical fibers and other optical elements that support communication between the rotor and stator cannot practically be disposed along the axis of rotation without disadvantageously interfering with the already limited space in which the patient lies.

Off-axis rotary joints generally include channel waveguides to direct the optical signal. In this regard, off-axis rotary joints generally include multiple optical sources, driven by one or more lasers, and multiple receivers in communication with respective channel waveguides. The multiple optical sources may be disposed circumferentially about either the rotor or the stator, while the receivers are disposed circumferentially about the other one of the rotor or the stator. For example, multiple optical sources may be disposed circumferentially about the rotor, while multiple receivers are disposed circumferentially about the stator, thereby supporting optical communications from the rotor to the stator.

In operation, each of the optical sources transmits the same optical signals. These optical signals are received by one or more of the receivers, depending upon the angular position of the rotor relative to the stator. While generally effective for permitting optical communication between a rotor and a stator, conventional off-axis rotary joints that employ channel waveguides do suffer from several shortcomings, especially at relatively high data rates.

As a result of the construction of a conventional off-axis rotary joint, the optical signals generally propagate along paths between the respective optical source and the respective receiver that have different lengths, thereby introducing varied time delays in the propagation of the optical signals. By way of example, a receiver of a conventional off-axis rotary joint commonly receives the same data from each of two adjacent optical sources. However, the optical signals emitted by the two optical sources travel different distances to reach the receiver and, as such, are received at somewhat different times. Accordingly, the pulse width of the optical signal is effectively broadened. To support communication at the high data rates that are desired, conventional off-axis rotary joints may need to be redesigned to have less spacing between the optical sources and the receivers and may eventually be unable to be further redesigned to support even higher data rates.

By way of example, one conventional fiber optic rotary joint has 16 optical sources spaced evenly in a circumferential manner about a slip ring having a diameter of 46 inches. Thus, the spacing $\Delta L$ between adjacent optical sources is $\Delta L = \pi * d/16 = 9$ inches (0.229 m). Accordingly, the time delay introduced by the separation of adjacent optical sources is $\Delta t = \Delta L/c = 0.76$ nsec. For a fiber optic rotary joint designed to support data transmitted at 1.25 Gbit/sec, the pulse width of each bit of data is $\Delta w = 1/1.25$ GHz=0.8 nsec. As such, for a receiver that receives the same optical signals from two adjacent optical sources, the time delay introduced by the spacing between the adjacent optical sources effectively lengthens the pulse width from 0.8 nsec to 1.56 nsec, that is, 0.8 nsec+0.76 nsec. As such, it will be difficult for the fiber optic rotary joint of this example to support error-free data transmission at 1.25 Gbit/sec, let alone to support communication at the even higher data rates that are desired.

In order to support higher data rates, a conventional fiber optic rotary joint may be redesigned to effectively reduce the spacing between adjacent optical sources, such as to within four inches (10.1 cm), which will introduce a time delay of 0.34 nsec between the optical signals transmitted by adjacent optical sources. Even with the redesign of the fiber optic rotary joint, the optimization of the detection electronic circuitry and careful alignment of the channel waveguides, a conventional rotary joint has difficulty supporting data rates greater than 1.25 Gbit/sec.

Conventional off-axis fiber optic rotary joints may also have additional shortcomings. In this regard, conventional off-axis rotary joints have relatively high losses. As such, conventional off-axis rotary joints require optical sources that operate at higher power levels to produce optical signals having more power, thereby creating issues relating to heat generation and disposal and requiring electronic driver circuitry having greater complexity. Additionally, conventional off-axis rotary joints having a plurality of channel waveguides also generally have a plurality of optical fibers for directing the optical signals from the channel waveguides to a photodiode. The plurality of optical fibers are bundled together and coupled to a photodiode via a lens assembly. As the data rate increases, however, a photodiode having a smaller active area is required. The increased ratio of the fiber diameter to photodiode area makes it more difficult to focus multiple optical signals onto the relatively small active area.

While conventional off-axis rotary joints support optical communications between a rotor and a stator, it would be desirable to provide an improved off-axis rotary joint. In particular, it would be advantageous to provide an off-axis rotary joint capable of supporting optical transmission between a rotor and a stator at relatively large data rates, such as 1.25 Gbit/sec and greater.

BRIEF SUMMARY OF THE INVENTION

An improved fiber optic rotary joint and an associated reflector assembly are therefore provided for supporting optical communications between a rotor and a stator. By designing the fiber optic rotary joint of at least some embodiments such that the path lengths of the optical signals incident upon a receiver are equal, the pulse width of the optical signals is not increased as in conventional off-axis rotary joints. Accordingly, the fiber optic rotary joint of the present invention can support optical communications between a rotor and stator at ultra-high data transmission rates. The fiber optic rotary joint of at least some embodiments of the present invention therefore supports data transmission that is independent of both data transmission rates and transmission optical wavelengths, and is only limited by the maximum data rate at which the optical fibers and the opto-electronic components can operate.

The fiber optic rotary joint of the present invention includes an optical source and, more typically, a plurality of optical sources, carried by either the rotor or the stator for transmitting optical signals. The fiber optic rotary joint also includes a reflector mounted upon the other one of the rotor and stator for reflecting the optical signals. Further, the fiber optic rotary joint includes a receiver for receiving the optical signals following their reflection. Advantageously, the reflector is shaped and positioned such that the path length along which the optical signals propagate from the optical source(s) to the receiver is equal, regardless of the relative rotational position of the rotor to the stator, thereby avoiding undesirable lengthening or stretching of the pulse width in the manner permitted by conventional off-axis rotary joints.

In one embodiment, the reflector is an elliptical reflector having a reflective surface shaped to define a portion of an ellipse. Generally, the elliptical reflector is mounted upon the stator for receiving optical signals from the optical source(s) carried by the rotor in order to support optical communications from the rotor to the stator. However, other embodiments of the fiber optic rotary joint of the present invention support communications in the opposite direction, that is, from the stator to the rotor.

The elliptically-shaped reflective surface defines first and second focal points. Advantageously, the elliptical reflector is positioned such that the first focal point lies along the central axis of the rotor. The fiber optic rotary joint also generally includes a slip ring defining a reference plane that is adapted to rotate with the rotor. Thus, the elliptical reflector may not only be positioned such that the first focal point lies along the central axis of the rotor, but may advantageously be positioned such that the first focal point lies in the reference plane defined by the slip ring at the center of the slip ring. A receiver may be disposed at the second focal point of the elliptical reflector so as to receive the optical signals that have been reflected therefrom. Alternatively, the reflector may include additional reflective elements in addition to the elliptical reflector for appropriately directing the optical signals to the receiver.

According to another aspect of the present invention, the reflector includes a hyperbolic reflector having a reflective surface shaped to define a portion of a hyperbola. The hyperbolically-shaped reflective surface defines a back focal point and a conjugate focal point. As such, the receiver may be disposed at the conjugate focal point of the hyperbolic reflector so as to receive the optical signals reflected therefrom.

In one embodiment, the reflector comprises a reflector assembly, including both the elliptical reflector and the hyperbolic reflector. In this embodiment, the elliptical reflector and the hyperbolic reflector are positioned relative to one another such that the second focal point of the elliptical reflector and the back focal point of the hyperbolic reflector are coincident. As such, optical signals received from an optical source are reflected by the elliptical reflector to the hyperbolic reflector and, in turn, to the conjugate focal point of the hyperbolic reflector. As such, a receiver may be disposed at the conjugate focal point of the hyperbolic reflector to receive the reflected optical signals. In this regard, the reflector assembly may include at least one focusing element disposed at the conjugate focal point of the hyperbolic reflector to receive the reflected optical signals. While the reflector assembly of this embodiment may be formed in various manners, the elliptical reflector and the hyperbolic reflector may be integrally formed of plastic having a reflective coating disposed upon portions thereof.

While the reflector assembly including both an elliptical reflector and a hyperbolic reflector may be mounted upon the stator for appropriately reflecting optical signals transmitted by optical sources carried by the rotor, the fiber optic rotary joint of another embodiment includes a hyperbolic reflector carried by the rotor for appropriately reflecting optical signals transmitted by optical sources mounted to the stator. In this regard, the hyperbolic reflector is carried by the rotor such that the back focal point of the hyperbolic reflector lies along the central axis of the rotor. By positioning the receiver at the conjugate focal point of the hyperbolic reflector, the reflected optical signals may be collected.

Regardless of the type of reflector, the reflector is adapted to receive optical signals having a plurality of different angles of incidence. Moreover, the reflective surface of the reflector is shaped and positioned such that the path length from each optical source to the receiver is identical for all optical signals received by the reflector regardless of the angle of incidence. Thus, the pulse width of the optical signals transmitted from the optical source(s) to the receiver are not lengthened or stretched as disadvantageously occurs in conventional off-axis rotary joints. Instead, the same optical signal transmitted by two or more optical sources are received at the same time by the receiver regardless of the angle of incidence at which the optical signals are received by the reflector. Thus, the fiber optic rotary joint and the associated reflector assembly according to the various embodiments of the present invention can support optical communications in either direction across the rotary interface, such as from the rotor to the stator as well as from the stator to the rotor, at ultra-high data rates including and exceeding 1.25 Gbit/sec. The fiber optic rotary joint of the present invention is also capable of supporting wavelength multiplexing by permitting optical signals having different wavelengths to be simultaneously transmitted across the rotary interface, thereby potentially further increasing the rate at which data can be transmitted thereacross.

The fiber optic rotary joint of one embodiment includes a plurality of elliptical reflectors mounted upon and spaced apart about the other one of the rotor and the stator for reflecting the optical signals incident thereupon. In order to reduce the number optical sources that are required while insuring that communication can continually be established between the rotor and the stator, the fiber optic rotary joint may also include a coupler for combining the optical signals reflected by the plurality of elliptical reflectors prior to receipt by said receiver. In another embodiment, the fiber optic rotary joint may include four circumferentially spaced elliptical reflectors for receiving different respective optical signals which can be subsequently recombined to thereby facilitate the transmission of data across the fiber optic rotary joint at even greater rates.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a perspective view of the reflector assembly of the embodiment depicted in FIGS. 1 and 2;

FIG. 4 is a schematic representation of a fiber optic rotary joint of another embodiment of the present invention, including an elliptical reflector;

FIG. 5 is a fiber optic rotary joint of yet another embodiment of the present invention, including a hyperbolic reflector carried by a slip ring;

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
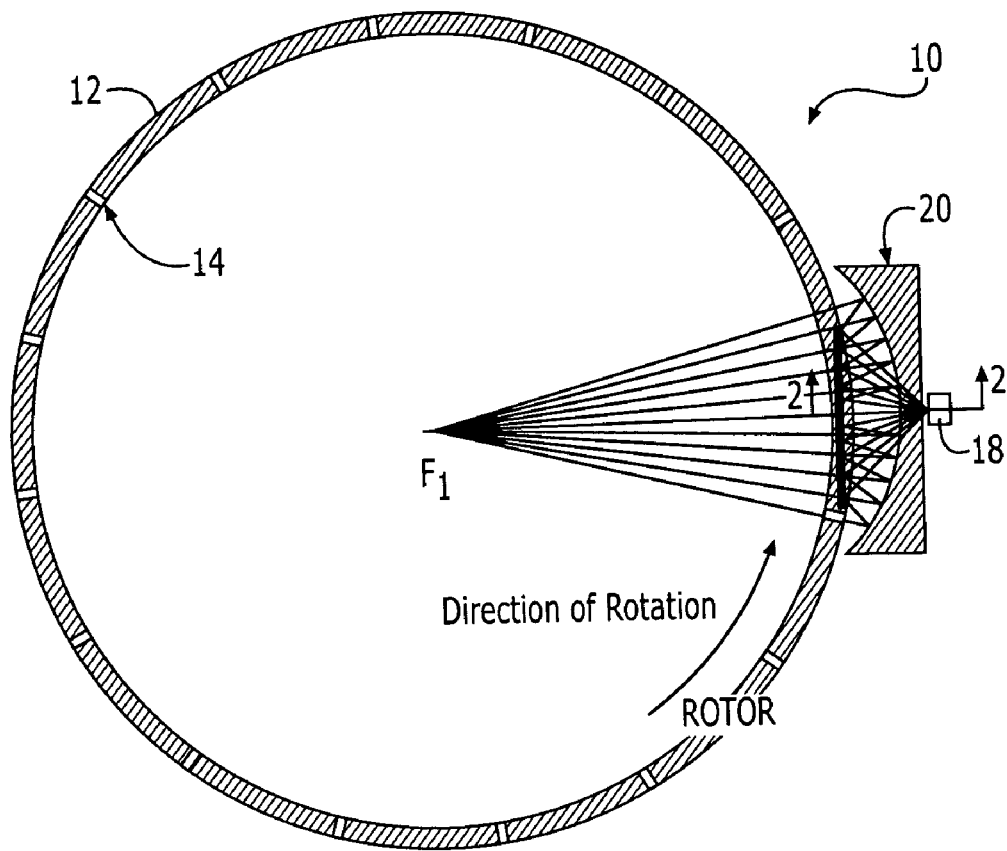
FIG. 1 is a schematic representation of a fiber optic rotary joint according to one embodiment of the present invention including a reflector assembly having both an elliptical reflector and a hyperbolic reflector.

Referring now to FIG. 1, a fiber optic rotary joint 10 according to one embodiment of the present invention is depicted. The fiber optic rotary joint is capable of supporting optical communications between a rotating element, such as a rotor, and a stationary element, such as a stator. As described hereinafter, the optical communications may be directed from the rotor to the stator or from the stator to the rotor, depending upon the application. As such, the fiber optic rotary joint may be employed in a variety of applications including, for example, being employed in conjunction with CT scanners. As shown in FIG. 1, the fiber optic rotary joint generally includes an annular slip ring 12 carried by the rotor and adapted to rotate therewith as known to those skilled in the art. The slip ring may have various sizes depending on the application, but has a diameter of 46 inches in one embodiment. While the rotor and stator are not shown, the slip ring is depicted with those components of the fiber optic rotary joint that are adapted to rotate with the rotor shown to be mounted upon the slip ring, and those components of the fiber optic rotary joint that are mounted to the stator being shown to be radially outside of the slip ring.

The fiber optic rotary joint 10 includes at least one and, more generally, a plurality of optical sources 14, such as 16 optical sources in the illustrated embodiments. As shown in the embodiment of FIG. 1, the plurality of optical sources may be carried by the rotor and, in particular, by the slip ring 12. The optical sources are disposed circumferentially about the slip ring and are oriented so as to transmit optical signals in a radially outward direction therefrom. In embodiments that include multiple optical sources, the optical sources are generally spaced evenly about the slip ring as shown in FIG. 1, although the optical sources may be positioned in other manners if so desired. While the optical sources are shown to be carried by the slip ring in the embodiment of FIG. 1, the optical sources may, instead, be mounted upon the stator and may be positioned about the rotor so as to emit optical signals that propagate in a radially inward direction as described in conjunction with the embodiment of FIG. 5.

The fiber optic rotary joint 10 may include various types of optical sources 14. In one embodiment depicted in FIG. 1, the optical sources comprise lasers or other sources of optical signals that are spaced circumferentially about the slip ring 12 for emitting signals in a radially outward direction. In another embodiment, however, the optical source includes one or more optical fibers 13 from which optical signals are emitted, with the distal ends of the optical fiber(s) from which the optical signals are emitted also generally spaced circumferentially, such as about the slip ring in the manner shown in FIG. 1. The optical source of this embodiment can also include a laser or other source 15 of the optical signals. The laser or other source is in optical communication with the optical fiber(s) such that the optical signals provided by the laser or other source propagate through the optical fiber(s) and are emitted therefrom. In this regard, the distal ends of the optical fiber(s) from which the optical signals are emitted are also generally spaced circumferentially, such as about a slip ring, such that the optical signals are emitted in a radially outward direction in a like manner to that illustrated in FIG. 1. By utilizing optical fibers to transmit the optical signals from the laser or other source to the point at which the optical signals are emitted, the laser or other source may be remotely located, thereby at least partially isolating or otherwise protecting the laser or other source from interference, such as electromagnetic interference (EMI) that may be present at the rotary interface.

In one embodiment, a common laser or other source 15 provides the same optical signals to each of a plurality of optical fibers 13 such that each of the optical fibers emits the same optical signals. In another embodiment, at least some of the optical fibers may be driven by a different source, such as a different laser. Thus, different ones of the optical fibers may emit different signals. A further description of these embodiments is provided hereinbelow in conjunction with FIGS. 6 and 7.

The fiber optic rotary joint 10 also includes a reflector 16 for receiving the optical signals from the optical source(s) 14 and for reflecting the optical signals to a receiver 18. A receiver generally includes a photodiode 19, but can include other types of detectors, if desired. Typically, the receiver also includes an optical fiber 21 for receiving the reflected signals and for directing the optical signals to the photodiode such that the photodiode may be disposed remotely from the reflector, thereby at least partially protecting the photodiode or other detector from interference that may be generated proximate the rotary interface. Additionally, the receiver may include a focusing lens for initially receiving the reflected optical signals and for focusing the optical signals into the optical fiber for transmission to a photodiode. However, the receiver can be configured in other manners, if so desired.

While the optical source(s) 14 are carried by one of the rotor and the stator, the reflector 16 is mounted upon the other one of the rotor and stator. In the embodiment depicted in FIG. 1 in which the optical sources are carried by the rotor and, in particular, by a slip ring 12, the reflector is mounted upon the stator. The reflector is designed to receive optical signals that arrive at a number of different angles of incidence. Additionally, the reflector has a reflective surface that is advantageously shaped and positioned such that the path length from each optical source to the receiver 18 is identical for all optical signals that are reflected, regardless of the angle of incidence. As such, the optical signals emitted by the optical sources will be received in unison by the receiver, thereby eliminating jitter and insuring that the pulse width is not lengthened or stretched as disadvantageously occurs in conventional off-axis rotary joints. Thus, the fiber optic rotary joints 10 of the present invention can support optical communications at higher data rates, such as data rates exceeding 1.25 Gbit/sec, with the only limits upon the data rate generally being the maximum data rate that the optical fibers and the opto-electronic components, including the optical source and the photodiode, can operate.

Figure 2:
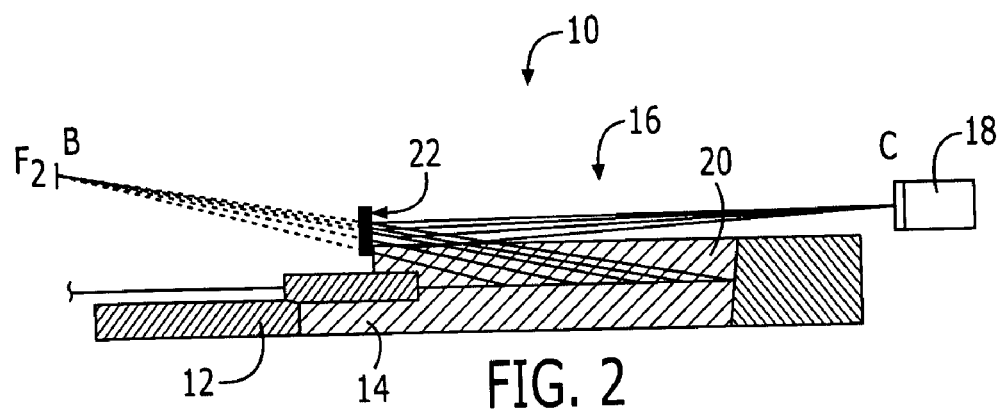
FIG. 2 is a cross-sectional view of the fiber optic rotary joint taken along line 2—2 of FIG. 1.

The reflector 16 of the embodiment depicted in FIG. 1 and, in more detail, in FIG. 2 is embodied by a reflector assembly that includes an elliptical reflector 20 having a reflective surface shaped to define a portion of an ellipse. The elliptically shaped reflective surface defines first and second focal points, $F_1$ and $F_2$. Moreover, the elliptical reflector is positioned such that the first focal point lies along a central axis of the rotor. More particularly, in embodiments in which the optical source(s) 14 are carried by a slip ring 12, the elliptically-shaped reflective surface is positioned such that the first focal point lies in a reference plane defined by the slip ring and is coincident with the center of the slip ring. By positioning the elliptically-shaped reflective surface such that the first focal point lies along the central axis of the rotor and, in particular, at the center of the slip ring, optical signals that are emitted by the optical source(s) in a radially outward direction will be reflected by the elliptically-shaped reflective surface and redirected to the second focal point.

As known to those skilled in the art, a fiber optic rotary joint 10 may have in-plane runout and/or out-of-plane runout—both of which are intrinsically corrected by the reflector 16 of the present invention. In this regard, in-plane runout is generally attributable to an expansion of the slip ring 12 upon rotation and the inability to fabricate the slip ring so as to be perfectly round. Out-of-plane runout is typically caused by the tolerances associated with all of the components including the ball bearings, mounting brackets and the slip ring. As a result of the accumulation of these tolerances, the physical axis of the fiber optic rotary joint may be slightly skewed from its axis of rotation. As a result of the design of the reflector assembly of the present invention, however, both types of runout are corrected.

The reflector assembly of the embodiment depicted in FIGS. 1 and 2 also includes a hyperbolic reflector 22 that reflects the signals received from the elliptical reflector 20 to the receiver 18. The hyperbolic reflector includes a reflective surface shaped to define a portion of a hyperbola. The hyperbolically-shaped reflective surface defines a back focal point B and a conjugate focal point C. In this embodiment, the reflector assembly is designed such that the second focal point $F_2$ of the elliptical reflector and the back focal point of the hyperbolic reflector are coincident. Thus, the optical signals reflected by the elliptical reflector toward the second focal point are intercepted by the hyperbolic reflector, which serves to focus the optical signals to the conjugate focal point. See, for example, the dashed lines in FIG. 2 that depict the path of the reflected optical signals toward the second focal point in the absence of the hyperbolic reflector. By disposing the receiver at the conjugate focal point of the hyperbolic reflector, all of the optical signals initially received by the elliptical reflector, regardless of the angle of incidence, are focused upon the receiver. In this regard, the focusing lens of the receiver may be disposed at the conjugate focal point of the hyperbolic reflector for receiving the optical signals and for focusing the optical signals onto an optical fiber that delivers the optical signals to a photodiode or other detector.

The elliptical reflector 20 and the hyperbolic reflector 22 of the reflector assembly of this embodiment may be discrete reflectors that are appropriately positioned relative to one another and relative to the optical source(s) 14 and the receiver 18. In one embodiment, however, the elliptical reflector and the hyperbolic reflector are integral, thereby reducing the complexity associated with optically aligning multiple reflectors and focusing multiple optical signals onto a single photodiode as required by conventional techniques, and accordingly reducing manufacturing costs. For example, a reflector assembly in which the elliptical reflector and the hyperbolic reflector are integral can be formed of plastic, such as by injection molding plastic to have the desired shape to define the elliptically-shaped reflective surface and the hyperbolically-shaped reflective surface. Optical grade ABS or other optical grade moldable plastics may be utilized. Preferably, the surfaces of the mold that will define the elliptically-shaped reflective surface and the hyperbolically-shaped reflective surface are polished. As such, the resulting elliptically-shaped reflective surface and hyperbolically-shaped reflective surface can then be immediately coated, such as with gold, aluminum or other reflectory metals without further polishing. However, the plastic component may be polished following injection molding and prior to coating with a reflective coating, if so desired.

The reflector assembly is formed such that the elliptically-shaped reflective surface and the hyperbolically-shaped reflective surface are appropriately positioned relative to one another such that: (i) the first focal point $F_1$ of the elliptically-shaped reflective surface lies along the central axis of the rotor, (ii) The second focal point $F_2$ of the elliptically-shaped reflective surface and the back focal point of the hyperbolically-shaped reflective surface are coincident, and (iii) the conjugate focal point of the hyperbolically-shaped reflective surface is coincident with the receiver 18. In order to ensure proper placement of the receiver, the reflector assembly may define a lens barrel 24 in which at least one focusing element, such as a focusing lens, is disposed at a location coincident with the conjugate focal point of the hyperbolically-shaped reflective surface. See FIG. 3, for example.

Advantageously, the entire reflector assembly including the elliptical reflector 20 and the hyperbolic reflector 22 are radially outside of the rotor. As shown in FIGS. 1 and 2, for example, the elliptical reflector may be disposed radially outward from the outer periphery of the rotor or the slip ring 12 carried by the rotor, while the hyperbolic reflector overlies the slip ring, but does not protrude into the interior of the rotor or the slip ring carried by the rotor. As such, the entire bore defined by the rotor remains open and free of obstruction by the reflector assembly. While the hyperbolic reflector is shown to overlie the slip ring in FIGS. 1 and 2, the reflector assembly may be sized such that the hyperbolic reflector is also radially outside of the rotor and the slip ring carried by the rotor in some embodiments.

In the embodiment of the reflector assembly depicted in more detail in FIGS. 2 and 3, the reflector assembly includes a shelf 26 extending radially inward from the elliptical reflector 20 for carrying the hyperbolic reflector 22. This shelf extends over the outer portion of the slip ring 12 such that the hyperbolic reflector may be appropriately positioned relative to the elliptical reflector. An opening 28 may be defined by the shelf to permit the propagation of the optical signals to be checked. The reflector assembly may be mounted to the stator such that the slip ring and, in particular, the optical source(s) 14 carried by the slip ring are positioned such that the optical signals emitted by the optical source(s) pass by the hyperbolic reflector (such as by passing over the hyperbolic reflector in the orientation depicted in FIG. 3) so as to be incident upon the elliptically-shaped reflective surface and are then reflected to the hyperbolic reflector and, in turn, to the lens barrel.

The reflector 16, such as the reflector described above and depicted in FIGS. 2 and 3, need not include both an elliptical reflector 20 and a hyperbolic reflector 22. As shown in the embodiments of FIG. 5, for example, the reflector may include only an elliptical reflector. The design choice to include or not to include a hyperbolic reflector involves a tradeoff since the hyperbolic reflector advantageously brings the focus of the optical signals to the stator side of the fiber optic rotary joint 10 and reduces the spread of the incident angle of the optical signals at the focal point, while disadvantageously increasing the propagation path length and complicating the design. In the embodiments that do not include a hyperbolic reflector, the elliptical reflector is again mounted to the stator so as to receive optical signals directed radially outward from one or more optical sources 14 carried by the rotor and, in particular, by a slip ring 12 mounted upon the rotor. The elliptical reflector of these embodiments is again positioned such that the first focal point $F_1$ of the elliptically-shaped reflective surface lies along the central axis of the rotor and, in particular, is coincident with the center of the slip ring and lies within the reference plane defined by the slip ring. In contrast to the elliptical reflector described above, the elliptical reflector of these embodiments is positioned such that the second focal point $F_2$ lies radially outside of the rotor. As such, the optical signals need not again be reflected by a hyperbolic reflector in order to be detected by a receiver 18 disposed radially outward from the rotor. Instead, the receiver may be positioned coincident with a second focal point of the elliptically-shaped reflective surface and at a position radially outside of the rotor. In the illustrated embodiments, the receiver includes an optical fiber 21 for receiving the reflected optical signals and for transmitting the optical signals to a photodiode or other detector 19. Although not shown, the receiver may also include focusing optics, such as one or more focusing lenses, disposed at the second focal point of the elliptical reflector for focusing the optical signals into the optical fiber.

A reflector 16 may also include a hyperbolic reflector 22, independent of any elliptical reflector. Additionally, the reflector may be carried by the rotor and, in particular, by a slip ring 12 carried by the rotor to support optical communications directed from the stator to the rotor. In this embodiment, one or more hyperbolic reflectors may be mounted upon the slip ring. As shown in FIG. 5, these hyperbolic reflectors are adapted to receive optical signals that are emitted by one or more optical sources 14 mounted to the stator and that propagate in a radially inward direction toward the center of the rotor. The hyperbolically-shaped reflective surface of each hyperbolic reflector is therefore shaped and positioned such that the back focal point B lies along the central axis of the rotor and, in particular, is coincident with the center of the slip ring and lies within the reference plane defined by the slip ring. As such, the optical signals that are incident upon the hyperbolic reflector are focused to the conjugate focal point C of the hyperbolic reflector. Advantageously, the hyperbolically-shaped reflective surface of each hyperbolic reflector is also shaped and positioned such that the conjugate focal point is located upon the rotor and, in particular, upon the slip ring. As such, a receiver 18 may be disposed at the conjugate focal point of the hyperbolic reflector to receive the reflected optical signals.

As shown in FIG. 5, an optical fiber 21 may be disposed at the conjugate focal point C for receiving the optical signals from a respective reflector 22 and for directing the optical signals to a photodiode or other detector 19. Additionally, a focusing element, such as one or more focusing lenses, may be disposed at the conjugate focal point for receiving the reflected optical signals and for focusing the optical signals into the optical fiber. In the illustrated embodiment having two or more reflectors adapted to receive the same optical signals, albeit a somewhat different angular positions of the rotor with respect to the stator, a respective optical fiber receives the optical signals from each reflector and the optical signals delivered by each optical fiber are subsequently combined, such as by an optical combiner or optical coupler 25, prior to being detected by a photodiode or other detector. As described above, the hyperbolic reflector 22 receives optical signals having various angles of incidence depending upon the relative rotational relationship of the rotor to the stator. However, the path length of each of the optical signals reflected by the hyperbolic reflector from the optical source to the receiver is identical, thereby ensuring that the pulse width is not disadvantageously broadened or stretched.

It is desirable to ensure that optical communications can be continuously conducted between the rotor and the stator regardless of the relative angular position of the rotor with respect to the stator. In order to ensure the continuity of optical communications, the fiber optic rotary joint 10 can include a sizable number of optical sources 14, such as 16 optical sources and a single reflector assembly, as shown in FIG. 1. In order to reduce the number of optical sources, the fiber optic rotary joint can include two or more reflector assemblies. In the embodiment depicted in FIG. 5, for example, two hyperbolic reflectors 22 are mounted upon the slip ring 12. However, the fiber optic rotary joint can include three or more reflectors 16 spaced about the slip ring 12, if so desired. Likewise, the fiber optic rotary joint depicted in FIG. 1 can include fewer optical sources if either additional reflector assemblies are mounted to the stator and spaced circumferentially about the rotor or if the reflector assembly includes a larger reflector, i.e., a reflector that has a greater circumferential length. The optical sources and the reflectors are preferably positioned to ensure that as the optical signals emitted by one optical source are exiting one reflector, the optical signals emitted by another optical source begin to be reflected by a second reflector, thereby ensuring continuity in the optical communication between the rotor and the stator.

The number of optical sources 14 and reflectors 16 also generally dictate the collimation requirements. In this regard, fiber optic rotary joints 10 having fewer optical sources and reflectors will generally have a longer free space propagation distance therebetween, in comparison to fiber optic rotary joints having more optical sources and reflectors. As the free space propagation distance increases, the collimation requirement is tighter or more stringent so as to minimize the divergence of the optical signals as the optical signals travel a greater distance. Thus, at least those fiber optic rotary joints have a relatively few number of optical sources and reflectors may require collimation optics, such as a collimation lens, to collimate the optical signals provided by the optical sources prior to transmission across the rotary interface.

By insuring that all of the path lengths are identical, however, the pulse width of the optical signals remains constant regardless of the particular optical source(s) 14 and receiver(s) 18 that are communicating and regardless of the relative rotational position of the rotor with respect to the stator. Thus, the fiber optic rotary joint 10 of the present invention can support optical communications across a rotary interface in a manner independent of data transmission rates, thereby permitting data transmission at data rates of 1.25 Gbits/sec or more.

Although a common laser or other source 15 may provide the same optical signals to each optical fiber 13 such that each optical fiber emits the same optical signals as described above, at least some of the optical fibers may be driven by different sources so as to emit different signals. While each optical fiber may be configured to emit a different optical signal, a fiber optic rotary joint 10 of one embodiment divides the optical fibers into quadrants as defined by the reflector position on the stator. Within each quadrant, the optical fibers emit the same optical signals. However, the optical signals emitted by the optical fibers of one quadrant are different than the optical signals emitted by the optical fibers of the other quadrants. Correspondingly, the fiber optic rotary joint of this embodiment may include four pairs of reflectors 16 and receivers 18, one adapted to receive the optical signals emitted by the optical fibers of a respective quadrant.

Figure 6:
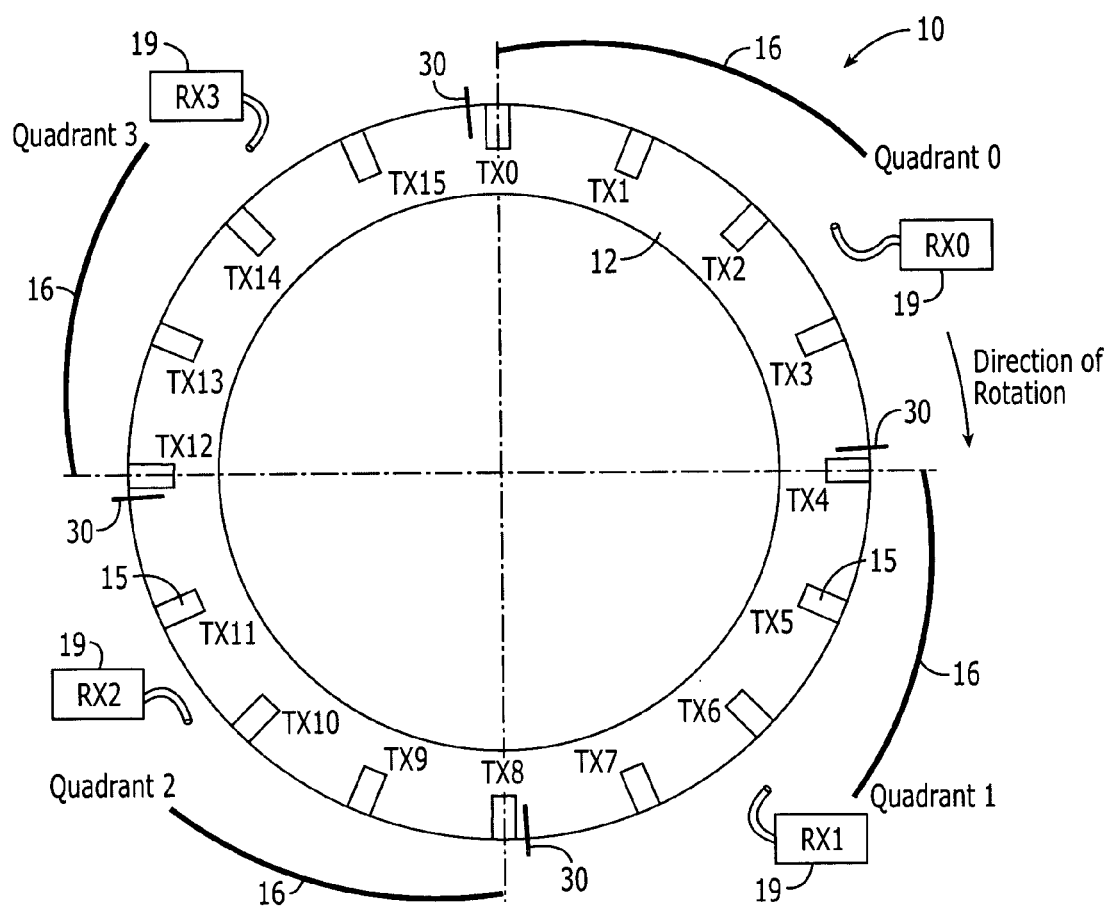
FIG. 6 is a schematic representation of a fiber optic rotary joint of another embodiment in which different groups of the optical sources transmit different optical signals to respective receivers.

As shown in FIG. 6, for example, a fiber optic rotary joint 10 includes sixteen optical sources 15 (designated TX0–TX15) circumferentially spaced evenly about the rotor. The fiber optic rotary joint of the illustrated embodiment also includes four reflectors 16, such as four elliptical reflectors 20, that focus the optical signals incident thereupon to a respective optical fiber that, in turn, delivers the optical signals to a respective detector 19. The fiber optic rotary joint of this embodiment therefore also includes four detectors, one associated with each reflector. The reflectors are spaced circumferentially about the stator. As shown, the reflectors are also spaced apart from one another such that a single reflector is adapted to receive the optical signals emitted by the optical sources that are disposed within a respective quadrant of the fiber optic rotary joint. As denoted in FIG. 6, the four quadrants are designated Quadrant 0, Quadrant 1, Quadrant 2 and Quadrant 3.

As shown, the reflectors 16 are sized and positioned to simultaneously receive optical signals from two or three optical sources 15. The two or three optical sources that emit optical signals that are incident upon the same reflector are advantageously driven to emit the same optical signals. However, the optical signals incident upon one of the reflectors are generally different from the optical signals incident upon the other reflectors so as to increase the quantity of data transmitted via the fiber optic rotary joint 10. In other words, the optical sources that emit optical signals that are incident upon RX0 are generally driven to emit different optical signals than those emitted by the optical sources incident upon RX1, RX2 and RX3. As also shown in FIG. 6, as the rotor rotates, the optical sources are generally switched shortly before the an optical source enters a quadrant so as to emit optical signals that are identical to the optical signals emitted by the other optical sources within the quadrant. Exemplary locations at which the optical sources can be switched are depicted by hash marks 30 in FIG. 6.

Figure 7:
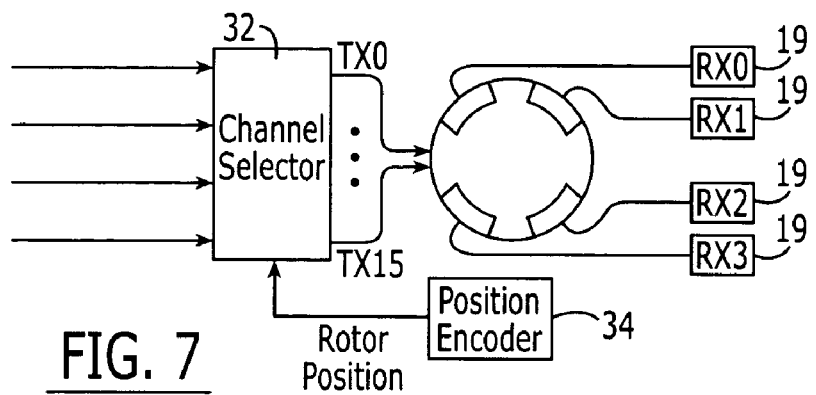
FIG. 7 is a schematic view of a communications system including the fiber optic rotary joint of FIG. 6.

In order to illustrate the manner in which a fiber optic rotary joint 10 of the type depicted in FIG. 6 may be utilized to increase the data transmission rate, reference is now had to FIG. 7. Upstream of the fiber optic rotary switch, a 5 Gbps signal is divided into four 1.25 Gbps signal streams utilizing conventional digital electronics. Via the channel selector 32, the four 1.25 Gbps signal streams are routed to different respective groups of optical sources 15 for transmission across the rotary joint to a respective receiver 18. Relative to the embodiment depicted in FIG. 6, for example, one signal stream may be routed to TX0–TX3 for transmission to RX0, a second signal stream may be routed to TX4–TX7 for transmission to RX1 and so forth. The four 1.25 Gbps signals streams may then be reconstructed to form the original 5 Gbps signal. The fiber optic rotary joint of this embodiment may include an angular position encoder 34 to track the location of the slip ring 12 such that the channel selector can appropriately switch the 1.25 Gbps signal streams to the respective groups of optical sources. For example, upon rotation of the rotor such that TX3, TX7, TX11 and TX15 pass the hash marks 30 in FIG. 7, the channel selector can switch TX3 to output the same optical signals as TX4–TX6, can switch TX7 to output the same optical signals as TX8–TX10, and so forth since these optical sources are rotating into a different quadrant. Thus, the fiber optic rotary switch of the present invention can readily transmit optical signals at extremely high data rates.

Figure 8:
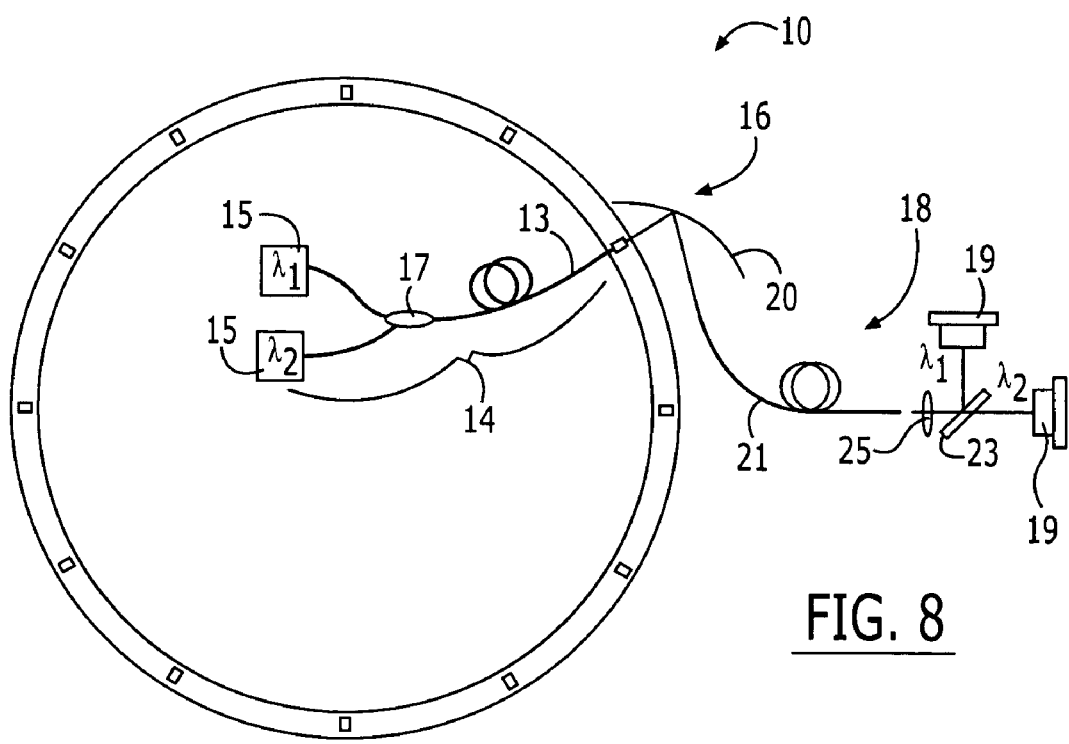
FIG. 8 is a schematic representation of a fiber optic rotary joint according to another embodiment of the present invention that supports wavelength multiplexing.

The fiber optic rotary joint 10 of the present invention also supports the transmission of optical signals having different wavelengths. In this embodiment depicted in FIG. 8, the fiber optic rotary joint includes two or more lasers or other sources 15 for providing optical signals having different respective wavelengths. The fiber optic rotary joint of this embodiment may also include separate optical fibers 13 for transmitting the optical signals having different wavelengths from each respective laser or other source to the rotary interface. Alternatively, the optical source 14 may include a fiber coupler 17 as shown in FIG. 8 for combining the optical signals having different wavelengths such that the combined optical signals can be transmitted to the rotary interface by means of a common optical fiber.

In this embodiment in which optical signals having different wavelengths have been combined, the receiver 18 may be configured to include a splitter 23, such as a dichroic filter, for separating the optical signals having different wavelengths, and a plurality of photodiodes or other detectors 19 for receiving the optical signals having a respective wavelength. In the embodiment in which the receiver is remote from the rotary interface, the optical signals having the different wavelengths typically propagate along a common optical fiber 21 prior to being collimated, such as by a collimating lens 25, and then split in accordance with the wavelength of the optical signals.

By utilizing wavelength multiplexing, the bandwidth may be increased without increasing the modulation rate of the optical sources 15. Since the costs associated with increasing the modulation rate of the optical sources may be substantial at larger data rates, such as data rates in excess of 1 Gbit/sec, the inclusion of two or more lasers or other sources that provide optical signals with different wavelengths may sometimes be more economical. The fiber optic rotary joint 10 of the present invention generally has a relatively high efficiency in regards to the transmission of optical signals across the rotary interface. As such, optical sources 14 may be selected that emit optical signals having lower power, but that are advantageously capable of operating at higher data rates than those utilized by conventional fiber optic rotary joints. For example, the optical sources of the fiber optic rotary joint of the present invention may be vertical cavity surface emitting lasers (VCSELs) or distributed feedback (DFB) lasers. Alternatively, the fiber optic rotary joint of the present invention can utilize laser diodes that emit optical signals having a wavelength of 660 nm and power levels exceeding 50 mW as utilized by conventional fiber optic rotary joints even though these laser diodes have a more limited modulation bandwidth, cost more, require a larger injection current and are generally more difficult to modulate than the lower power optical sources.

In one embodiment, the optical sources 14 carried by the rotor comprise an array of VCSELs, such as 2×12 VCSEL arrays, in order to reduce the overall size, number of components and assembly costs relative to optical sources comprised of a plurality of individual VCSELs or other individual laser sources. In order to improve fiber management, fiber ribbon(s) may be utilized to receive the optical signals emitted by respective ones of the VCSELs and to propagate the optical signals to individual optical fibers, typically optically coupled to the fiber ribbon by means of a silicon micro-machined breakout adapter. The optical fibers are then routed to different, generally equally spaced positions about the periphery of the rotor for transmitting the optical signals across the rotary interface as described above in conjunction with the embodiment of FIG. 8. In order to provide for equal path lengths, the length of each optical fiber if preferably identical.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber optic rotary joint for providing optical communication between a rotor and a stator, comprising:
   an optical source carried by one of the rotor and the stator for transmitting optical signals;
   an elliptical reflector mounted upon the other one of the rotor and the stator for reflecting the optical signals, said elliptical reflector comprising a reflective surface configured as a portion of an ellipse, wherein the elliptically-shaped reflective surface defines first and second focal points and is positioned such that the first focal point lies along a central axis of the rotor; and
   a receiver disposed to receive the reflected optical signals.

2. A fiber optic rotary joint according to claim 1, and further comprising:
   a hyperbolic reflector for reflecting the signals received from said elliptical reflector, said hyperbolic reflector comprising a reflective surface shaped to define a portion of a hyperbola, and
   wherein the hyperbolically-shaped reflective surface defines a back focal point and a conjugate focal point.

3. A fiber optic rotary joint according to claim 2 wherein the second focal point of said elliptical reflector and the back focal point of said hyperbolic reflector arc coincident.

4. A fiber optic rotary joint according to claim 2 wherein said receiver is disposed at the conjugate focal point of said hyperbolic reflector.

5. A fiber optic rotary joint according to claim 1 wherein said receiver is disposed at the second focal point of said elliptical reflector.

6. A fiber optic rotary joint according to claim 1, and further comprising:
   a slip ring adapted to rotate with the rotor,
   wherein said slip ring defines a reference plane, and
   wherein said elliptical reflector is positioned such that the first focal point lies in the reference plane at a center of said slip ring and the second focal point lies outside of the reference plane.

7. A fiber optic rotary joint according to claim 1 wherein said elliptical reflector receives optical signals having a plurality of different angles of incidence, and wherein said elliptical reflector is positioned such that a path length from said optical source to said receiver is identical for all optical signals reflected by said elliptical reflector regardless of the angle of incidence.

8. A fiber optic rotary joint according to claim 1, and further comprising:
   a plurality of circumferentially-spaced optical sources carried by the rotor, wherein said elliptical reflector is mounted upon the stator for receiving optical signals from said plurality of optical sources.

9. A fiber optic rotary joint according to claim 1, further comprising:
   a plurality of optical sources for transmitting optical signals having different respective wavelengths.

10. A fiber optic rotary joint according to claim 9, and further comprising:
    an optical coupler for combining the optical signals having different respective wavelengths.

11. A fiber optic rotary joint according to claim 9 wherein said receiver comprises a plurality of detectors for receiving optical signals having a respective wavelengths.

12. A fiber optic rotary joint according to claim 11 wherein said receiver further comprises:
    a splitter for separating the optical signals having different respective wavelengths prior to reception by said detectors.

13. A fiber optic rotary joint according to claim 1 wherein said optical source comprises an array of vertical cavity surface emitting lasers (VCSELs).

14. A fiber optic rotary joint according to claim 1, and further comprising:
    a plurality of elliptical reflectors mounted upon and spaced apart about the other one of the rotor and the stator for reflecting the optical signals incident thereupon.

15. A fiber optic rotary joint according to claim 14, and further comprising:
    a coupler for combining the optical signals reflected byte plurality of elliptical reflectors prior to receipt by said receiver.

16. A fiber optic rotary joint according to claim 14 wherein the plurality of elliptical reflectors comprises four circumferentially-spaced elliptical reflectors for receiving different respective optical signals.

17. A fiber optic rotary joint for providing optical communication between a rotor and a stator, comprising:
   an optical source carried by one of the rotor and the stator for transmitting optical signals;
   a hyperbolic reflector mounted upon the other one of the rotor and the stator for reflecting the optical signals, said hyperbolic reflector comprising a reflective surface configured as a portion of a hyperbola, wherein the hyperbolically-shaped reflective surface defines a back focal point and a conjugate focal point; and
   a receiver disposed to receive the reflected optical signals from said hyperbolic reflector.

18. A fiber optic rotary joint according to claim 17 wherein the back focal point of said hyperbolic reflector lies along the central axis of the rotor.

19. A fiber optic rotary joint according to claim 18 wherein said optical source is carried by the stator and said hyperbolic reflector is mounted upon the rotor.

20. A fiber optic rotary joint according to claim 17, and further comprising:
   an elliptical reflector for receiving optical signals from said optical source and for reflecting the optical signals to said hyperbolic reflector, said elliptical reflector comprising a reflective surface configured as a portion of an ellipse, and
   wherein the elliptically-shaped reflective surface defines first and second focal points and is positioned such that the first focal point lies along a central axis of the rotor.

21. A fiber optic rotary joint according to claim 20 wherein the second focal point of said elliptical reflector and the back focal point of said hyperbolic reflector are coincident.

22. A fiber optic rotary joint according to claim 17 wherein said receiver is disposed at the conjugate focal point of said hyperbolic reflector.

23. A fiber optic rotary joint according to claim 17 wherein said hyperbolic reflector receives optical signals having a plurality of different angles of incidence, and wherein said hyperbolic reflector is positioned such that a path length from said optical source to said receiver is identical for all optical signals reflected by said hyperbolic reflector regardless of the angle of incidence.

24. A fiber optic rotary joint according to claim 17 further comprising a plurality of optical sources for transmitting optical signals having different respective wavelengths.

25. A fiber optic rotary joint according to claim 24 further comprising an optical coupler for combining the optical signals having different respective wavelengths.

26. A fiber optic rotary joint according to claim 24 wherein said receiver comprises a plurality of detectors for receiving optical signals having a respective wavelengths.

27. A fiber optic rotary joint according to claim 26 wherein said receiver further comprises a splitter for separating the optical signals having different respective wavelengths prior to reception by said detectors.

28. A fiber optic rotary joint according to claim 17 wherein said optical source comprises an array of vertical cavity surface emitting lasers (VCSELs).

29. A fiber optic rotary joint according to claim 17, and further comprising:
   a plurality of hyperbolic reflectors mounted upon and spaced apart about the other one of the rotor and the stator for reflecting the optical signals incident thereupon.

30. A fiber optic rotary joint according to claim 29, and further comprising:
   a coupler for combining the optical signals reflected by the plurality of elliptical reflectors prior to receipt by said receiver.

31. A fiber optic rotary joint according to claim 29 wherein the plurality of hyperbolic reflectors comprises four circumferentially-spaced hyperbolic reflectors for receiving different respective optical signals.

32. A fiber optic rotary joint for providing optical communication between a rotor and a stator, comprising:
   an optical source carried by one of the rotor and the stator for transmitting optical signals;
   a reflector mounted upon the other one of the rotor and the stator for receiving optical signals having a plurality of different angles of incidence and for reflecting the optical signals, wherein said reflector is disposed radially outside of the rotor; and
   a receiver disposed to receive the reflected optical signals, wherein said reflector comprises a reflective surface shaped and positioned such that a path length from said optical source to said receiver is identical for all optical signals reflected by said reflector regardless of the angle of incidence.

33. A fiber optic rotary joint according to claim 32 wherein said reflector comprises an elliptical reflector having a reflective surface configured as a portion of an ellipse, wherein the elliptically-shaped reflective surface defines first and second focal points and is positioned such that the first focal point lies along a central axis of the rotor.

34. A fiber optic rotary joint according to claim 33 wherein said reflector is disposed at the second focal point of said elliptical reflector.

35. A fiber optic rotary joint according to claim 33 wherein said reflector further comprises:
   a hyperbolic reflector for reflecting the signals received from said elliptical reflector, wherein said hyperbolic reflector comprises a reflective surface configured as a portion of a hyperbola, wherein the hyperbolically-shaped reflective surface defines a back focal point and a conjugate focal point, and wherein the second focal point of said elliptical reflector and said back focal point of said hyperbolic reflector are coincident.

36. A fiber optic rotary joint according to claim 35 wherein said reflector is disposed at the conjugate focal point of said hyperbolic reflector.

37. A fiber optic rotary joint according to claim 32 wherein said optical source is carried by the stator, wherein said reflector is mounted upon the rotor and comprises a hyperbolic reflector having a reflective surface configured as a portion of a hyperbola, wherein the hyperbolically-shaped reflective surface defines a back focal point and a conjugate focal point, and wherein the back focal point lies along the central axis of the rotor.

38. A fiber optic rotary joint according to claim 37, and further comprising:
   a plurality of optical sources circumferentially spaced about the stator and a plurality of hyperbolic reflectors circumferentially spaced about the rotor such that the optical signals emitted by one of said optical sources are always incident upon one of said hyperbolic reflectors.

39. A fiber optic rotary joint according to claim 32, and further comprising:
   a plurality of optical sources for transmitting optical signals having different respective wavelengths.

40. A fiber optic rotary joint according to claim 39, and further comprising:

an optical coupler for combining the optical signals having different respective wavelengths.

41. A fiber optic rotary joint according to claim 39 wherein said receiver comprises a plurality of detectors for receiving optical signals having a respective wavelengths.

42. A fiber optic rotary joint according to claim 41 wherein said receiver further comprises a splitter for separating the optical signals having different respective wavelengths prior to reception by said detectors.

43. A fiber optic rotary joint according to claim 32 wherein said optical source comprises an array of vertical cavity surface emitting lasers (VCSELs).

44. A fiber optic rotary joint according to claim 32, and further comprising:
a plurality of reflectors mounted upon and spaced apart about the other one of the rotor and the stator for reflecting the optical signals incident thereupon.

45. A fiber optic rotary joint according to claim 44, and further comprising:
a coupler for combining the optical signals reflected by the plurality of reflectors prior to receipt by said receiver.

46. A fiber optic rotary joint according to claim 44 wherein the plurality of reflectors comprises four circumferentially-spaced reflectors for receiving different respective optical signals.

47. A reflector assembly for use in a fiber optic rotary joint for providing optical communication between a rotor and a stator, said rotary joint including an optical source carried by one of the rotor and stator for transmitting optical signals to the other of the rotor and stator, said reflector assembly comprising:
an elliptical reflector comprising a reflective surface configured as a portion of an ellipse, wherein the elliptically-shaped reflective surface defines first and second focal points; and
a hyperbolic reflector comprising a reflective surface configured as a portion of a hyperbola, wherein the hyperbolically-shaped reflective surface defines a back focal point and a conjugate focal point, wherein the second focal point of said elliptical reflector and said back focal point of said hyperbolic reflector are coincident.

48. A reflector assembly according to claim 47, and further comprising:
at least one focusing element at the conjugate focal point of said hyperbolic reflector.

49. A reflector assembly according to claim 47 wherein said elliptical reflector and said hyperbolic reflector are comprised of plastic having a reflective coating disposed upon portions thereof.

50. A reflector assembly according to claim 47 wherein said elliptical reflector and said hyperbolic reflector comprise are integral.

* * * * *